United States Patent [19]
Sherno

[11] Patent Number: 5,257,842
[45] Date of Patent: Nov. 2, 1993

[54] COLLISION IMPACT ABSORBER

[76] Inventor: Stanley A. Sherno, 700 Burns St., Gallitzin, Pa. 16641

[21] Appl. No.: 851,545

[22] Filed: Mar. 13, 1992

[51] Int. Cl.⁵ .............................................. B60R 19/00
[52] U.S. Cl. ......................................... 293/1; 180/276; 188/5
[58] Field of Search .................... 293/1, 102, 131, 132, 293/6, 149, 150, 155; 180/276; 188/5

[56] References Cited

U.S. PATENT DOCUMENTS 3,349,865 10/1967 Deutsch .............................. 180/276
3,472,332 10/1969 Hahvajian ............................... 293/6
3,495,676 2/1970 Graham .................................. 293/6

FOREIGN PATENT DOCUMENTS 592295 9/1947 United Kingdom ................ 180/276

Primary Examiner—Robert R. Song
Attorney, Agent, or Firm—Larson & Taylor

[57] ABSTRACT

An impact absorber for a vehicle having a frame and a front bumper includes an elongate arm having a front end and a back end. This arm is suitably mounted by a mounting system in a rest position at an angle to horizontal with the back end higher than the front end and the front end extending beyond the bumper so that the front end is engaged before any other portion of the vehicle by any horizontal impact force at the level thereof. The mounting system includes a rotation device for mounting the back end of the arm to the frame for rotation about a horizontal axis such that a horizontal impact force to the front end of the arm is changed directly to a lifting force at the rotation device and hence to a lifting force of the frame of the vehicle as the arm rotates about the rotation device due to the impact force. Preferably, the front end includes a vertical extension with a forwardmost pad. In addition, the mounting device also includes a spring attached to the arm for resiliently holding the arm in the rest position.

5 Claims, 1 Drawing Sheet

COLLISION IMPACT ABSORBER

BACKGROUND OF THE INVENTION

To stop a moving body on a straight plain requires its kinetic energy to be consumed. To retain a moving body in the state of motion requires energy. If the body assumes no additional energy, it will deplete its energy content and come to a stop position. This requires substantial distance. If a shorter stopping distance is required, the most common method is a braking system which disperses energy more rapidly. However, if a body in the state of motion is not of solid mass, but is comprised of many components and is required to stop in a very short distance, it is physically impossible to accomplish without extensive damage. For example, a 3,000 pound vehicle of any kind brought to a stop in two or three inches.

SUMMARY OF THE INVENTION

The collision Impact Absorber allows the total energy content to be consumed by the energy required to elevate the moving body; plus extending its stopping distance by a very large percentage. Extending the distance between the axis and point of impact again increases its lift and distance to further its effectiveness. These same results can be accomplished when the Collision Impact Absorber is placed on the front, back or side of a moving body.

DETAILED DESCRIPTION OF THE PREFERRED EMBODIMENT

Figure 1:
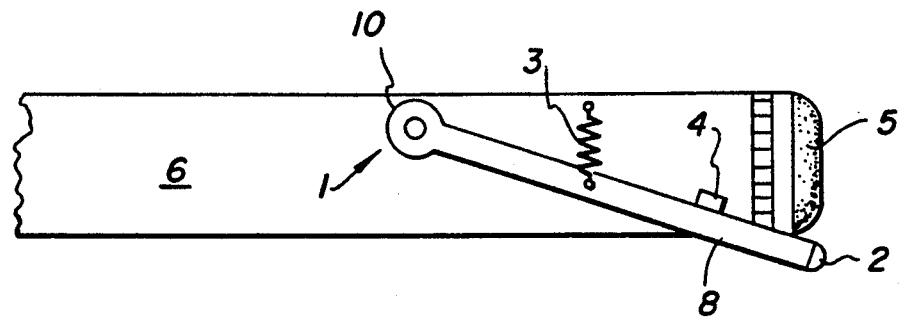
FIG. 1 is a schematic side view of the Collision Impact Absorber as attached to a frame.
Figure 2:
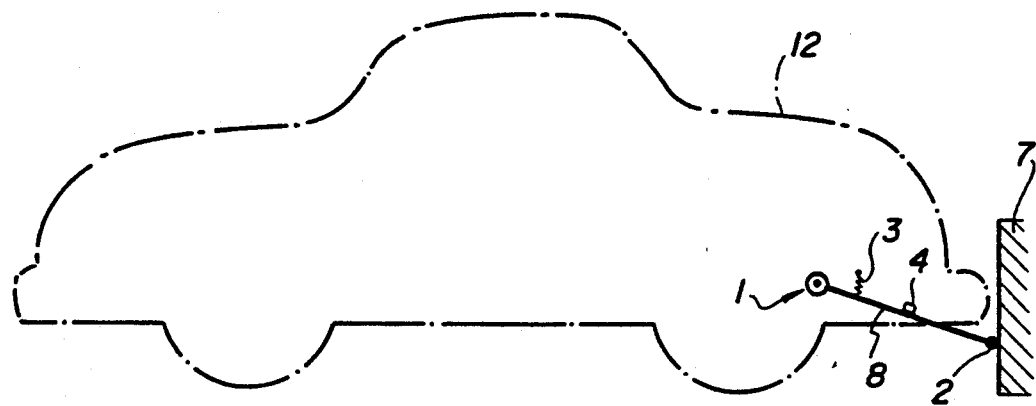
FIG. 2 is a schematic illustration of an automobile equipped with the Collision Impact Absorber at point of impact.
Figure 3:
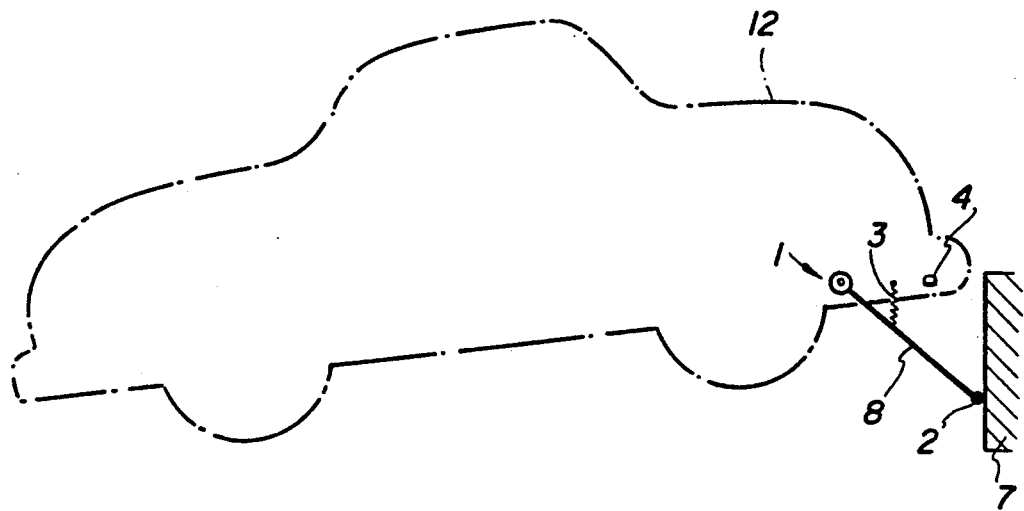
FIG. 3 is a schematic illustration of an automobile equipped with the Collision Impact Absorber after impact.

This invention is now described in more detail by reference to the following examples:

FIG. 1 is a side view of the Collision Impact Absorber as attached to a vehicle (12). FIG. 2 illustrates the vehicle (12) equipped with the Collision Impact Absorber shown in FIG. 1 at point of impact with object (7). FIG. 3 illustrates a portion of the vehicle (12) equipped with the Collision Impact Absorber shown in FIG. 1 after impact has occurred. Like numbers refer to like parts in all drawings.

This invention consists of a metal arm (8) with a swivel or hinge means (10) on one end (1) attached to an automobile frame (6). This arm (8) extends at an angle toward the bumper (5) to point of impact (2). There is a spring or recoil system (3) attached between the arm (8) and frame (6) that acts as an equalizer on impact and repositions the arm (8) after impact. A stop (4) is also required on the frame (6) to maintain the arm's (8) position.

Upon impact as shown in FIG. 3, the arm (8) lifts the vehicle, therefore extending its stopping distance and minimizing the impact.

We claim:

1. An impact absorber for a vehicle having a frame and a front bumper comprising:
    an elongate arm having a front end and a back end;
    a mounting means for mounting said arm in a rest position at an angle to horizontal with said back end higher than said front end and said front end extending forwardly so that said front end is primarily engaged by any horizontal impact force at the level thereof, said mounting means including a rotation means for mounting said back end of said arm to the frame for rotation about a horizontal axis such that a horizontal impact force to said front end of said arm is changed directly to a lifting force at said rotation means and hence to a lifting force of the frame of the vehicle as said arm rotates about said rotation means due to the impact force.

2. An impact absorber for a vehicle as claimed in claim 1 wherein said front end includes a vertical extension.

3. An impact absorber for a vehicle as claimed in claim 2 wherein said front end extends beyond the front bumper and hence receives any horizontal impact force before any other portion of the vehicle.

4. An impact absorber for a vehicle as claimed in claim 3 wherein said mounting means includes a spring means attached to said arm for resiliently holding said arm in the rest position.

5. An impact absorber for a vehicle as claimed in claim 1 wherein said mounting means includes a spring means attached to said arm for resiliently holding said arm in the rest position.

* * * * *